United States Patent
Khetawat

(10) Patent No.: US 8,544,060 B1
(45) Date of Patent: Sep. 24, 2013

(54) METHOD AND SYSTEM FOR DETECTING AND PROTECTING AGAINST POTENTIAL DATA LOSS FROM UNKNOWN APPLICATIONS

(75) Inventor: Rupesh Khetawat, Pune (IN)

(73) Assignee: Symantec Corporation, Mountain View, CA (US)

( * ) Notice: Subject to any disclaimer, the term of this patent is extended or adjusted under 35 U.S.C. 154(b) by 26 days.

(21) Appl. No.: 13/360,084

(22) Filed: Jan. 27, 2012

(51) Int. Cl.
*G06F 17/00* (2006.01)
*H04L 29/06* (2006.01)

(52) U.S. Cl.
USPC .............................................. 726/1; 713/165

(58) Field of Classification Search
USPC .............................................. 726/1; 713/165
See application file for complete search history.

(56) References Cited

U.S. PATENT DOCUMENTS

2005/0081121 A1* 4/2005 Wedel et al. ..................... 714/48
2009/0232300 A1* 9/2009 Zucker et al. ..................... 380/2

* cited by examiner

*Primary Examiner* — Techane Gergiso
(74) *Attorney, Agent, or Firm* — Lowenstein Sandler LLP

(57) ABSTRACT

A system and method for detecting and protecting against potential data loss from unknown applications is described. In one embodiment, a method includes detecting, by an endpoint data loss prevention (DLP) system running on a client computing device, that a local application has accessed a document on the client computing device. The method further includes determining that the document contains sensitive data according to one or more DLP polices of the endpoint DLP system and determining that a combination of the local application and a type of the document is not included in a whitelist of the DLP policies. Then, the method includes capturing at least one of one or more screenshots, and video of one or more operations that the application performs on the document and sending the captured at least one of the one or more screenshots, and the video to an enforcement server associated with the endpoint DLP system.

15 Claims, 6 Drawing Sheets

METHOD AND SYSTEM FOR DETECTING AND PROTECTING AGAINST POTENTIAL DATA LOSS FROM UNKNOWN APPLICATIONS

TECHNICAL FIELD

The methods and systems described below relate to data loss prevention. More specifically, a system and method for detecting and protecting against potential data loss from unknown applications are described.

BACKGROUND

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

To protect an organization's sensitive information, data loss protection (DLP) systems are typically installed by the organization, especially on important machines where confidential data is getting generated. These DLP systems are designed to detect and prevent unauthorized use and transmission of confidential information. DLP technologies apply configurable rules to identify objects, such as files, that contain sensitive data and should not be found outside of a particular enterprise or specific set of host computers or storage devices. However, these DLP systems may not be able to protect each computer in the enterprise, due to reasons like a large number of different platforms or operating systems (OS), machine outages, quick and dynamic provisioning of virtual machines, and no clear and individual accounting for test and lab machines. Even when the DLP technologies are deployed, it is possible for sensitive objects to 'leak'. Often times, the leakage is accidental. However, in some cases, such leakage is deliberate and malicious.

Even with DLP systems in place, organizations still face a threat to their sensitive data that can be stolen using unknown applications or other unknown means. For example, users may try to circumvent DLP protections by using changing the file format to one that cannot be detected by the DLP systems. These unknown means may include, but are not limited to, file conversion tools that convert the sensitive file from text to sound and then copy data to Universal Serial Bus (USB) or sending over web mail, chat; file encryption tools that encrypt the sensitive file and then copy the encrypted sensitive file to USB or sending over web mail, chat; file compression tools that compress file and then copy compressed sensitive file to USB or sending over web mail, chat; screen capturing tools that capture sensitive data in the form of images or videos and then send it to USB or over web mail or chat; and web tools that convert sensitive files and steal the data; and other tools to break into sensitive files and then steal the data.

Current DLP systems have been effective at addressing the above-described problem in relation to print screen and screen scraping. However, current DLP systems have not produced any solutions to address the way in which the data leak is detected when it occurs through non-conventional mechanisms.

SUMMARY

A system and method for detecting and protecting against potential data loss from unknown applications is described. In one embodiment, an endpoint device includes a memory to store instructions for a data loss prevention (DLP) policy and a processing device coupled with the memory. The processing device is configured to detect that a local application of the endpoint device has accessed a document on the client computing device and determine that the document contains sensitive data according to the DLP policy. The processing device is further configured to determine that a combination of the local application and a type of the document is not included in a whitelist of the DLP policies and capture at least one of one or more screenshots, and video of one or more operations that the application performs on the document. The processing device is also configured to send the captured at least one of the screenshot, the multiple screenshots, and the video to an enforcement server associated with the endpoint DLP system.

In some embodiments, the processing device in the endpoint device is further configured to receive one or more updated DLP policies from the enforcement server, the one or more updated DLP policies including changes based on the captured at least one of the one or more screenshots, and the video. Furthermore, in some embodiments, the one or more updated DLP policies cause the endpoint DLP system to at least one of blacklist the combination of the application and document type, restrict access to the document, encrypt the document, and move the document to a different location.

In some embodiments, the endpoint DLP system utilizes one or more application programming interfaces (APIs) of an operating system of the client computing device in order capture the at least one of the one or more screenshots, and the video. In other embodiments, the one or more screenshots are taken at periodic time intervals over a time span that the application is in use.

In some embodiments, the enforcement server analyzes the captured data to determine if at least one of malicious or suspicious activity occurred with respect to the document on the endpoint device. Furthermore, in some embodiments, the whitelist includes one or more different application and document type pairs that have been approved by an administrator of the endpoint DLP system as being an allowable combination.

In some embodiments, the processing device in the endpoint device is further configured to, prior to the capturing, present a notice to a user of the application that the application may be subject to screenshot or video capture that presents privacy issues and allowing access to the document when the user acknowledges and accepts the notice.

In one embodiment, a method includes detecting, by an endpoint data loss prevention (DLP) system running on a client computing device, that a local application has accessed a document on the client computing device. The method further includes determining that the document contains sensitive data according to one or more DLP polices of the endpoint DLP system and determining that a combination of the local application and a type of the document is not included in a whitelist of the DLP policies. Then, the method includes capturing at least one of one or more screenshots, and video of one or more operations that the application performs on the document and sending the captured at least one of the one or more screenshots, and the video to an enforcement server associated with the endpoint DLP system.

In one embodiment, a computer readable medium includes instructions that will cause a processor that executes the instructions to receive, by an enforcement server device of a data loss prevent (DLP) system including the processor, data representing captured at least one of one or more screenshots, or video of an application manipulating a sensitive document at an endpoint DLP system of the DLP system. The instructions further cause the processor to analyze the received captured data to determine whether at least one of suspicious or malicious activity occurred with respect to the sensitive document and update, by the enforcement server device, one or more DLP policies based on the results of the analysis. Furthermore, the instructions cause the processing device to deploy the one or more updated DLP policies to one or more endpoint DLP systems.

BRIEF DESCRIPTION OF THE DRAWINGS

The system and methods are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
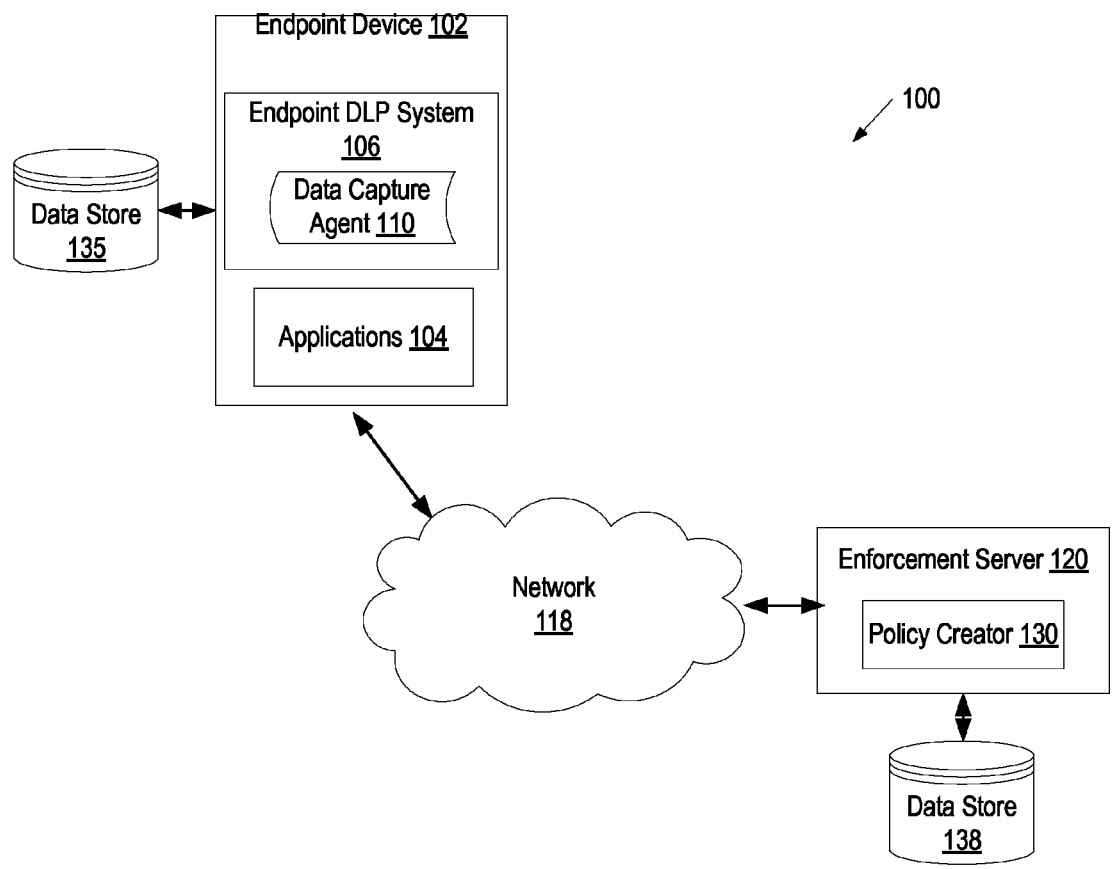
FIG. 1 illustrates an exemplary network architecture, in accordance with one embodiment of the present invention.

A system and method for detecting and protecting against potential data loss from unknown applications are described. When a sensitive document is opened by an application, data loss may occur via mechanisms that are unknown to a data loss prevention (DLP) system. In such cases, embodiments of the invention automatically capture a screenshot of the application or capture a video of the desktop when the sensitive document is opened by an application. In addition, a whitelist is provided that exempts certain application/document type combinations from this data capture process in order to streamline the ability to identify suspicious or malicious activity when related to sensitive documents.

In one embodiment, a method includes detecting, by an endpoint data loss prevention (DLP) system running on a client computing device, that a local application has accessed a document on the client computing device. The method further includes determining that the document contains sensitive data according to one or more DLP polices of the endpoint DLP system and determining that a combination of the local application and a type of the document is not included in a whitelist of the DLP policies. Then, the method includes capturing at least one of one or more screenshots, and video of one or more operations that the application performs on the document and sending the captured at least one of the one or more screenshots, and the video to an enforcement server associated with the endpoint DLP system.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "accessing", "receiving", "determining", "restricting," "deleting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates an exemplary network architecture 100, in accordance with one embodiment of the present invention. The network architecture 100 includes an endpoint device 102 connected to an enforcement server 120 via a network 118. The network 118 may be a private network (e.g., a local area network (LAN), wide area network (WAN), intranet, etc.), a public network (e.g., the Internet), or a combination thereof.

Enforcement server 120 manages data loss prevention (DLP) policies. Enforcement server 120 may be a single server computing device, or may include a cluster of multiple server computing devices. Each server computing device may include one or more processing devices, memory, a data store 138, and other hardware components. In one embodiment, a DLP policy is a data structure containing a rule or set of rules that govern the detection of sensitive data. The DLP policy may specify a particular content source or content sources to monitor, how to identify sensitive data, and/or an action to be performed when sensitive data or sensitive content sources are detected. DLP policies may also include enforcement rules. Enforcement rules specify actions for DLP systems to take when an identification rule in a DLP policy is violated. Examples of enforcement rules include rules to restrict operations, to notify an administrator of DLP policy violations, and so on. For example, an enforcement rule may cause a DLP system to send a notification to an administrator, prevent data from exiting the endpoint device 102 through a data loss vector, lock down the endpoint device 102 so that no data can be removed from the endpoint device through any data loss vector, encrypt data, and/or restrict other operations, to name a few examples.

Managing DLP policies may include generating and modifying DLP policies (e.g., based on administrator input) using policy creator 130. The DLP policies may be stored in data store 138. The enforcement server 120 may then propagate the DLP policies to the endpoint device 102 and other endpoint devices (not shown). Additionally, the enforcement server 120 may generate DLP response rules, which it may also propagate to the endpoint device 102 (either as components of a DLP policy or separately). The policy creator 130 is described in greater detail below with reference to FIG. 3.

Referring back to FIG. 1, each of the endpoint devices 102 may be a personal computer (PC), a laptop, a mobile phone, a tablet computer, or any other computing device. Each endpoint device 102 has multiple different data loss vectors. Each data loss vector may be a path or operation through which data can be transferred off of the endpoint device. Examples of data loss vectors include burning files to an optical disc, copying data to a portable drive (e.g., a portable universal serial bus (USB) drive), printing data to a printer, sending data through a fax, sending an email, sending an instant message, performing a print screen operation, etc. Each data loss vector may also be a mechanism that enables sensitive data to be saved, stored or otherwise retained. Examples of such data loss vectors include functions such as print, print screen, copy and paste, save page, save image, and so forth.

Endpoint device 102 includes an endpoint DLP system 106 that implements DLP policies to determine whether data is sensitive data (includes sensitive information). The endpoint device 102 runs an operating system (OS) (not shown) that manages hardware and software of the endpoint devices. The OS may be, for example, Microsoft® Windows®, Linux®, Symbian®, Apple's® OS X®, Solaris®, etc. One or more local applications 104 run on top of the OS and perform various operations that involve accessing, moving, or otherwise manipulating data for the endpoint device 102.

In some embodiments, applications 104 may include, but are not limited to, a word processing application, a web browsing application, a social media application, a gaming application, a data conversion application, a networking application, and so on. Applications 104 may store data to a temporary location in a data store 135 included in, attached directly to, or networked with the endpoint device 102. Applications 104 may have native support to open, read, or perform other operations on the data. Alternatively, applications 104 may include a plug-in or extension that enables the application 104 to read or otherwise operate on the data.

Endpoint DLP system 106 operates on endpoint device 102 to detect when sensitive information is accessed on endpoint device 102. For instance, when a document is opened by an application 104, endpoint DLP system 106 applies DLP policies received from enforcement server 120 to the document to determine whether the document contains sensitive data. In response to determining that a document does contain sensitive data, endpoint DLP system 106 may take one or more protective actions to prevent loss of the sensitive data.

However, in some cases, data loss may occur via mechanisms that are unknown to endpoint DLP system 106. For example, a user may convert a document to a file format that is not detectable by endpoint DLP system 106, or may utilize a program that is unknown to endpoint DLP system 106 to steal the data. Embodiments of the invention provide a mechanism to detect this potential data loss via unknown mechanisms by implementing a data capture process when suspicious activity is detected.

In one embodiment, endpoint DLP system 106 includes a data capture agent 110 that is configured to automatically capture a screenshot of the application 104 or capture a video of the desktop of endpoint device 102 when the sensitive document is opened by an application and the combination of application and document type does not fall under a whitelist exception. Further detail regarding the operations of endpoint DLP system 106 to detect the potential data loss via unknown mechanisms is now described with respect to FIG. 2.

Figure 2:
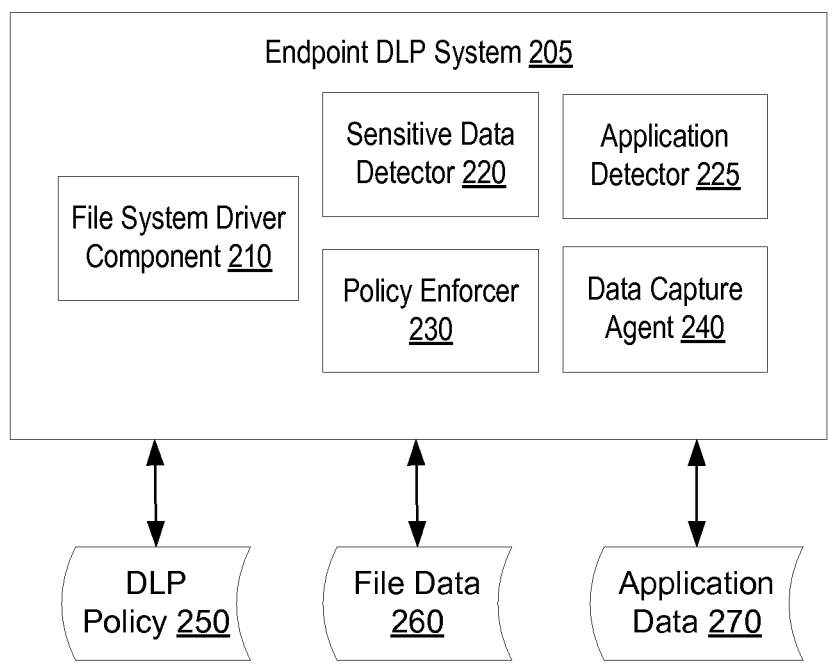
FIG. 2 is a block diagram of a data loss prevention system, in accordance with one embodiment of the present invention.

FIG. 2 illustrates a block diagram of endpoint DLP system 205 according to embodiments of the invention. In one embodiment, endpoint DLP system 205 is the same endpoint DLP system 106 described in FIG. 1. Endpoint DLP system 205 includes a file system driver component 210, a sensitive data detector 220, an application detector 225, a policy enforcer 230, and a data capture agent 240. In alternative embodiments, one or more of the file system driver component 210, sensitive data detector 220, application detector 225, policy enforcer 230, and data capture agent 240 may be combined into a single module or divided into multiple modules. Endpoint DLP system 205 may be implemented as a standalone application, as a plug-in or extension to an application, or as a combination of both. Additionally, some of the modules (or operations of some modules) may run at a kernel level, while other modules and/or operations run at a user level.

Endpoint DLP system 205 enforces one or more DLP policies. In one embodiment, endpoint DLP system 205 enforces a DLP policy 250 that is received from an enforcement server, such as enforcement server 120, and may be activated on or after receipt. While the DLP policy 250 is active, endpoint DLP system 205 monitors applications 104 to detect accesses to sensitive data.

When any document is opened by an application 104, file system driver component 210 detects this operation and notifies sensitive data protector 220. In one embodiment, file system driver component 210 detects this operation by intercepting a request to open the document via a file system filter driver, a browser extension, or by another component of the DLP system (e.g., by monitoring for packets at the network level). The file system filter driver may intercept all file commands, and determine whether the command will cause an operation to be performed on any portion of data in endpoint device 205. File system driver component 210 then causes file data 260 of the opened document to be sent to endpoint DLP system 205.

Sensitive data detector 220 extracts the content of the opened document (because the document may have its own format for storing data content), and determines whether the file data 260 includes sensitive data based on the received DLP policy 250. If the file data 260 is determined to be sensitive, then file system driver component 210 further causes application data 270 to be sent to endpoint DLP system 205. Application data 270 may include information such as the application 104 that is opening the document, the time the document is opened by application, the method of opening the application, and so on. Based on the received file data 260 and application data 270, application detector 225 determines the application 104 that opened the document and also determines the type of document, and passes this information to policy enforcer 230.

Policy enforcer 230 compares the received data to a whitelist of allowed application/document type pairs. In one embodiment, the whitelist is part of DLP policy 250 received from enforcement server 120. If the combination of the application and the type of the document is not found on the whitelist, then policy enforcer 225 instructs data capture agent 240 to begin monitoring the actions of the application 104. If the application 104/document type pair is listed on the whitelist, then the DLP system ignores the sensitive document access by application 104 for purposes of the data capture techniques that are described below.

Applications/document type pairs listed on the whitelist generally include known and approved pairs, such as a Microsoft™ Word application opening a document file (e.g., .doc), or Adobe™ Acrobat™ Reader opening a PDF document. In some embodiments, a user may request customization, such as adding a particular application/document type pair, to the whitelist. However, such customization should typically be approved by an administrator of the DLP system to avoid abuse the whitelist in order to circumvent DLP policies.

When instructed to start capturing data by policy enforcer 230, data capture agent 240 may perform a variety of techniques to capture actions and operations that the application 104 is performing on the sensitive data. The data capture agent 240 may capture a screenshot of the application that has opened the sensitive document, capture screenshots at regular intervals of the application that has opened the sensitive document until the document is closed or minimized, capture a video of desktop when the sensitive document is opened until the document is closed or minimized, and/or any combination of the above.

An administrator of DLP system may establish the settings of the data capture agent 240 in terms of which form of data capture the agent performs (e.g., single snapshot, multiple snapshots, time period interval between snapshots, video capture, some combination of the above). Furthermore, the data capture mechanisms used by data capture agent 240 may dynamically change based on the particular state of the endpoint DLP system 205 (e.g., memory user, processing resources used, time and day of the week, etc.). The administrator may further configure these dynamic settings as well.

In some embodiments, the data capture agent 240 operates in conjunction with a screenshot capture application driver or a video capture application driver to capture the screenshots and/or video. For instance, a variety of different application programming interfaces (APIs) may be available on the operating system of the endpoint device 102 that can capture screenshots of the desktop or that can take video (e.g., WebEx™ recordings, etc.). The data capture agent 240 may utilize these OS APIs internally in order to perform the data capture for the endpoint DLP system 205. In other embodiments, the data capture agent 240 includes functionality to perform the screenshot captures and/or video capture itself.

Embodiments of the invention further address privacy concerns related to capturing screenshots and video of an application or user desktop. In one embodiment, a disclaimer is displayed to the user on the desktop prior to the screenshot capture or video recording. The disclaimer may announce that the file being accessed is a sensitive document, and that photo and/or video may be recorded that are subject to privacy concerns. The user can then provide agreement to such action by checking an "I agree" box, or some other input mechanism. Once user acceptance is received, the user is then allowed to view the document, and the screenshots and/or video capture can take place. If the user does not agree, then the user can be prevented access to the sensitive file via the application 104.

The data capture agent 240 continues to capture screenshots and/or video until the application 104 is closed by the user. The captured data is then sent by endpoint DLP system 205 to enforcement server 120 for forensic analysis to determine any specific threats or loss of data that may have occurred. In one embodiment, the captured data is streamed to the enforcement server 120 in real-time. In other embodiments, the captured data is sent as a discrete file transfer of the network 118. If the endpoint device 102 is offline, then endpoint DLP system 205 may store the captured data until such point in time that it makes a connection with the enforcement server 120. In addition, other data may be sent to the enforcement server 120, such as metadata of the application (such as application name, binary internal name, signer/publisher name, etc.) and file system operations performed by the application.

Once the captured data and any other miscellaneous data are received at the enforcement server 120, the enforcement server 120 may respond in a variety of different ways. The operations of enforcement server 120 with respect to the received captured data are further described below with respect to FIG. 3.

Figure 3:
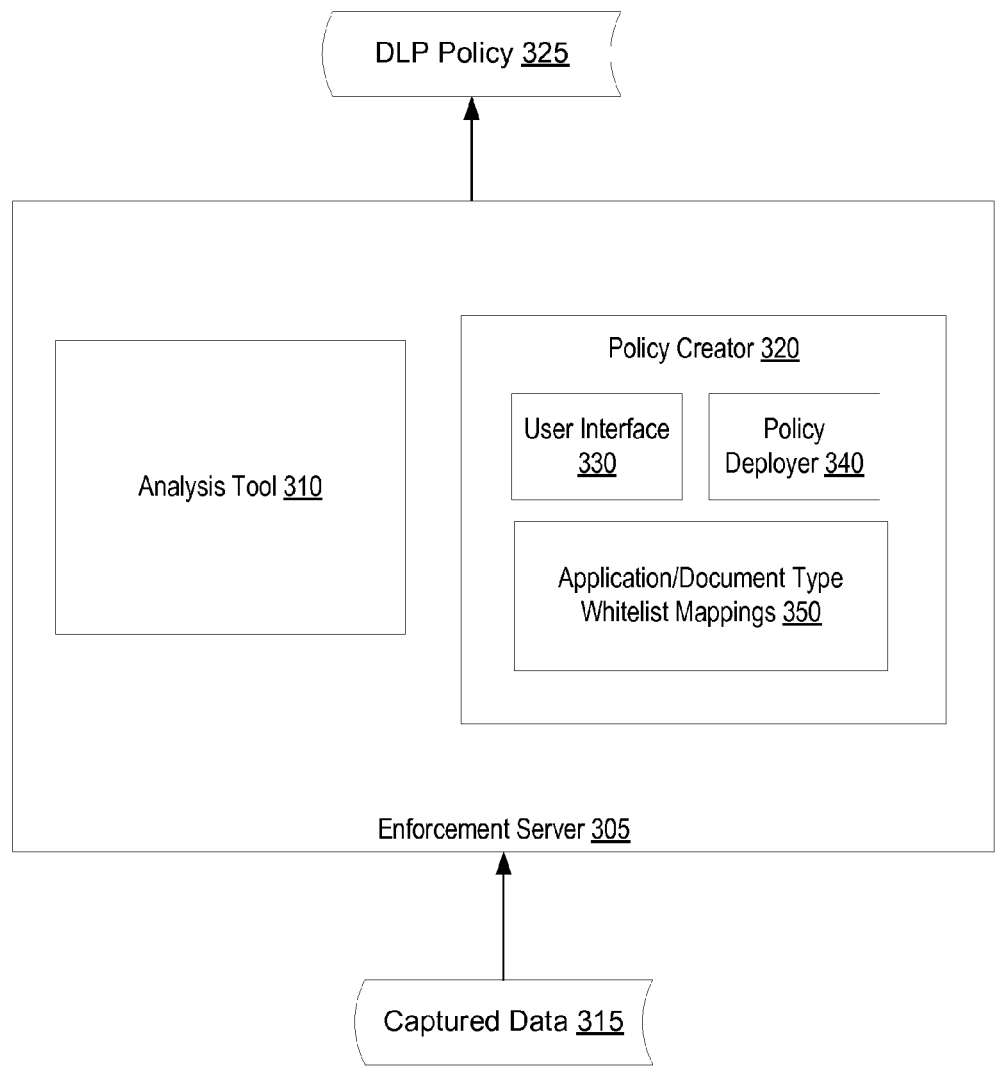
FIG. 3 is a block diagram of an enforcement server, in accordance with one embodiment of the present invention.

FIG. 3 is a block diagram of an enforcement server 305, in accordance with one embodiment of the present invention. In one embodiment, the enforcement server 305 is the same as enforcement server 120 described with respect to FIG. 1. Enforcement server 305 includes an analysis tool 310 and a policy creator 320 that includes a user interface 330, a policy deployer 340, and application/document type whitelist mappings 350. In one embodiment, policy creator 320 is the same as policy creator 130 described with respect to FIG. 1. Note that in alternative embodiments, the analysis tool 310 and the policy creator 320, including the sub-components 330-350 of policy creator 320, may be combined into a single module or divided into multiple modules.

When the data 315 captured by data capture agent 240 is sent to enforcement server 305, analysis tool receives this data and performs a forensic analysis on the data. In one embodiment, analysis tool may be a third-party tool that provides automated forensic analysis services on data, such as screenshots and videos, to identify activities and operations that occur in the screenshots and videos. In some embodiments, the analysis may be manually performed by an administrator using analysis tool 310. Moreover, the analysis may take into account other miscellaneous data provided to the enforcement server, such as metadata of the application (such as application name, binary internal name, signer/publisher name, etc.) and file system operations performed by the application.

If malicious activity or data loss is discovered, then enforcement server 305 may take an appropriate action to prevent the data loss. For instance, the policy creator 320 may update its DLP policies 325 to blacklist the application/document type combination resulting in the data loss. Conversely, if the captured data shows that the application/document type pair is an allowable combination, then policy creator may add the pair to the application/document type whitelist mappings 350 that it stores. Alternatively, or in addition, policy creator 320 update the DLP polices 325 to restrict access to the sensitive document by the user, encrypt the document, move the document to a different location, and so on.

Furthermore, policy creator 320 includes a user interface 330 that allows administrators to interact with policy creator 320. The user interface 330 may be, for example, a graphical user interface or a command line user interface. Via the user interface 330, administrators may select a type of DLP policy to create (e.g., an exact document matching (EDM) DLP policy, an indexed document matching (IDM) DLP policy, a described content matching (DCM) DLP policy, a machine learning based detection (MLD) DLP policy, or a web DLP policy). The administrator may also input data that may be used to generate the DLP policy. For example, the administrator may add additional application/document type pairings to the application/document type whitelist mappings 350 that can be used to update DLP policies 325.

These updated enforcement policies 325 are then pushed down to endpoint DLP systems for future use. Policy deployer 340 deploys generated DLP policies 325 for enforcement server 305. Deployment of a DLP policy 325 may include downloading the DLP policy to endpoint devices, such as endpoint device 102 described with respect to FIG. 1. The endpoint devices may include endpoint DLP systems that implement the DLP policies.

Returning to the discussion of FIG. 2, based on the received updated DLP policy, policy enforcer 230 may restrict operations of the application 104 with respect to certain document types. In some embodiments, enforcement polices may cause the DLP system to restrict access to the sensitive document by the user, encrypt the document, move the document to a different location, and so on. Enforcement can be performed using application programming interface (API) hooks, sandboxing, a browser extension, etc. In other embodiments, the data collected by data capture agent 240 may be stored by enforcement server 120 for use in subsequent actions against the user performing the malicious activity (e.g., legal action, etc.).

Figure 4:
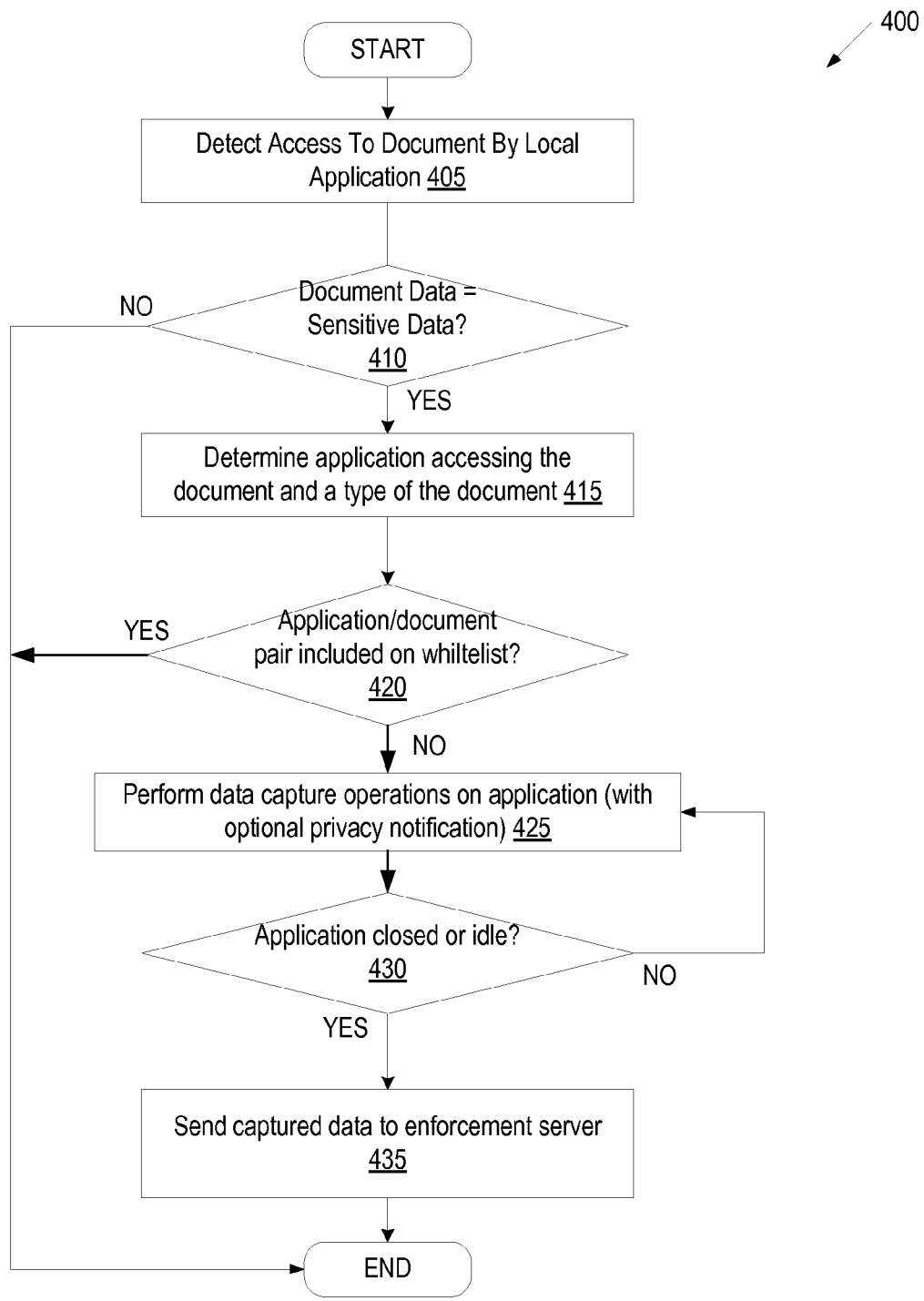
FIG. 4 is a flow diagram illustrating one embodiment for a method of detecting potential data loss and capturing screenshots and/or video of the potential data loss.

FIG. 4 is a flow diagram illustrating one embodiment for a method 400 of detecting potential data loss and capturing screenshots and/or video of the potential data loss. The method 400 is performed by processing logic that may comprise hardware (circuitry, dedicated logic, etc.), software (such as is run on a general purpose computer system or a dedicated machine), or a combination of both. Method 400 may be performed by an endpoint DLP system such as endpoint DLP system 205 of FIG. 2.

Referring to FIG. 4, at block 405 endpoint DLP system detects access to a document by a local application on the endpoint device. In one embodiment, the endpoint DLP system may include a file system driver component that can detect operations performed by application installed on the OS of the endpoint device. Then, decision block 410, it is determined whether the document data being access is sensitive data. In one embodiment, DLP endpoint system applied DLP policies to the data to make this determination. If the document data is not determined to be sensitive, then method 400 ends. On the other hand, if the data is indentified as sensitive, then method 400 proceeds to block 415, where the application accessing the document and a type of the document are determined.

Using the application and document type information, the endpoint DLP system then determines whether the application/document type pairing is included in a whitelist of the DLP policies programmed in the endpoint DLP system at decision block 420. If so, then the application opening the particular document type is a known pairing and method 400 ends.

If the application/document type pairing is not found on the whitelist, then method 400 proceeds to block 425 to perform data capture operation on the application. In embodiments of the invention, the data capture may be accomplished by capturing a screenshot of the application that has opened the sensitive document, capturing screenshots at regular intervals of the application that has opened the sensitive document until the document is closed or minimized, capturing a video of desktop when the sensitive document is opened until the document is closed or minimized, and/or any combination of the above. The endpoint DLP system may operate in conjunction with a screenshot capture application driver or a video capture application driver in order to capture the screenshots and/or video. In other embodiments, the endpoint DLP system includes the functionality to perform the screenshot captures and/or video capture itself.

At decision block 430, it is determined whether the application has been closed or is idle. If not, then method 400 returns to block 425 to continue with the data capture. If so, then method 400 continues to block 435 where the captured data is sent to an enforcement server for further analysis.

Figure 5:
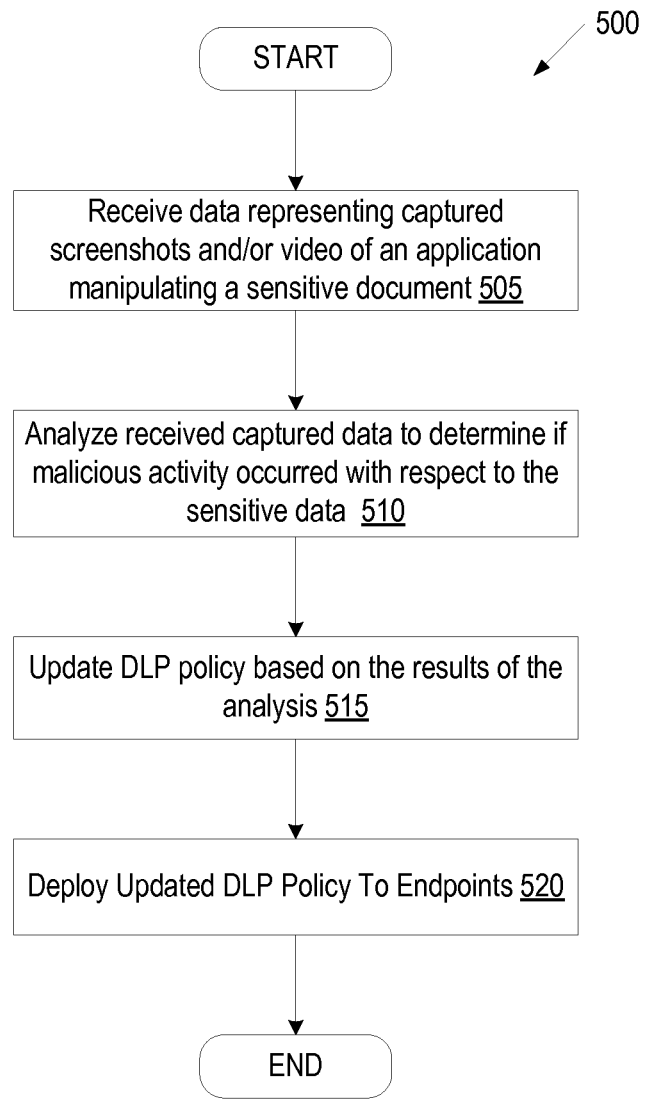
FIG. 5 is a flow diagram illustrating one embodiment for a method of generating a data loss prevention policy based on analysis of captured data representing a potential data loss scenario.

FIG. 5 is a flow diagram illustrating one embodiment for a method 500 of generating a data loss prevention policy based on analysis of captured data representing a potential data loss scenario. The method 500 is performed by processing logic that may comprise hardware (circuitry, dedicated logic, etc.), software (such as is run on a general purpose computer system or a dedicated machine), or a combination of both. Method 500 may be performed by a DLP enforcement server, such as enforcement server 305 described with respect to FIG. 3.

At block 505 of method 500, an enforcement server receives data representing captured screenshots and/or video of an application manipulating sensitive data. In one embodiment, the received data is sent from an endpoint DLP system operating on an endpoint device. Then, at block 510, the enforcement server analysis the received captured data to determine if malicious or suspicious activity occurred with respect to the sensitive data. In one embodiment, a third-party analysis tool may provide automated forensic analysis services on the captured data to identify the activities and operations that occur in the screenshots and videos and determine whether there were malicious or suspicious. In other embodiments, the analysis may be manually performed by an administrator at then enforcement server.

Subsequently, at block 515 one or more DLP policies are updated based on the results of the analysis conducted at block 510. For instance, the enforcement server may update its DLP policies to blacklist the application/document type combination that resulted in the data loss. Conversely, if the analysis shows that the application/document type pair is an allowable combination, then the enforcement server may add the pair to a whitelist of allowable application/document types that it stores. Alternatively, or in addition, the enforcement server may 320 update the DLP polices to restrict access to the sensitive document by the user, encrypt the document, move the document to a different location, and so on. Lastly, at block 520, the enforcement server deploys the updated DLP policy to its endpoint DLP systems.

Figure 6:
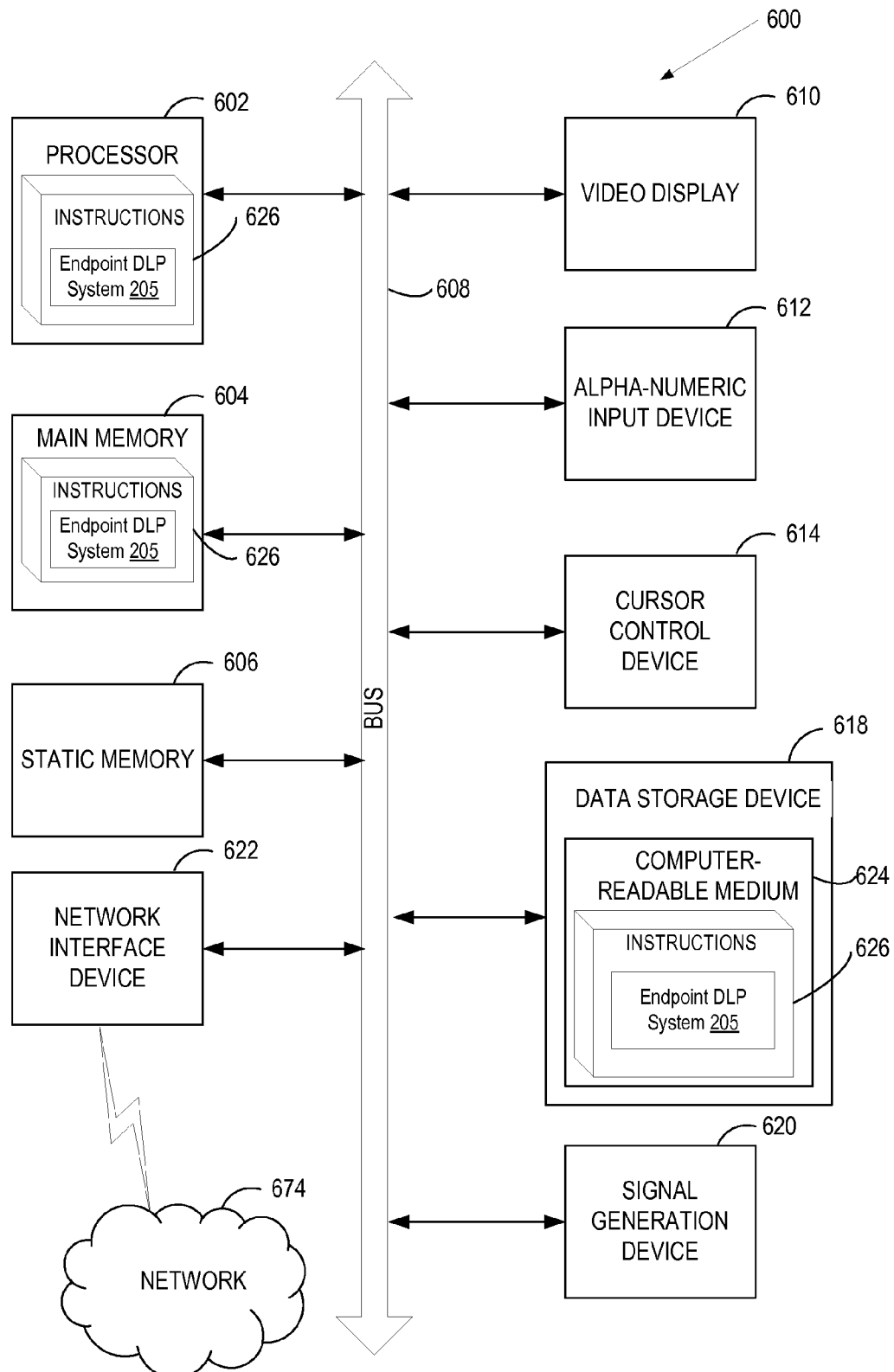
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for an endpoint DLP system that enforces a DLP policy (e.g., such as DLP system 205 of FIG. 2) and/or a software library containing methods that call such a DLP system. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In some embodiments, the above-described mechanism for detecting and protecting against potential data loss from unknown applications, such as endpoint DLP systems 106, 205, enforcement server 120, 305, and methods 400 and 500 described in FIGS. 1 through 5, may be implemented as part of a cloud-computing environment.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
    detecting, by an endpoint data loss prevention (DLP) system running on a client computing device, that a local application has accessed a document on the client computing device;
    determining that the document contains sensitive data according to one or more DLP polices of the endpoint DLP system;
    determining that a combination of the local application and a type of the document is not included in a whitelist of the DLP policies;
    capturing at least one of one or more screenshots, and video of one or more operations that the application performs on the document;
    sending the captured at least one of the one or more screenshots, and the video to an enforcement server associated with the endpoint DLP system; and
    receiving one or more updated DLP policies from the enforcement server, the one or more updated DLP policies comprising changes based on the captured at least one of the one or more screenshots or the video;
    wherein the one or more updated DLP policies cause the endpoint DLP system to at least one of blacklist the combination of the application and document type, restrict access to the document, encrypt the document, or move the document to a different location.

2. The computer-implemented method of claim 1, wherein the endpoint DLP system utilizes one or more application programming interfaces (APIs) of an operating system of the client computing device in order capture the at least one of the one or more screenshots or the video.

3. The computer-implemented method of claim 1, wherein the one or more screenshots are taken at periodic time intervals over a time span that the application is in use.

4. The computer-implemented method of claim 1, wherein the enforcement server analyzes the captured data to determine if at least one of malicious or suspicious activity occurred with respect to the document on the endpoint device.

5. The computer-implemented method of claim 1, wherein the whitelist comprises one or more different application and document type pairs that have been approved by an administrator of the endpoint DLP system as being an allowable combination.

6. The computer-implemented method of claim 1, further comprising, prior to the capturing:
    presenting a notice to a user of the application that the application may be subject to screenshot or video capture that present privacy issues; and
    allowing access to the document when the user acknowledges and accepts the notice.

7. An endpoint device, comprising:
    a memory to store instructions for a data loss prevention (DLP) policy; and a processing device coupled with the memory, wherein the processing device is configured to:

detect that a local application of the endpoint device has accessed a document on the client computing device;

determine that the document contains sensitive data according to the DLP policy;

determine that a combination of the local application and a type of the document is not included in a whitelist of the DLP policies;

capture at least one of one or more screenshots, and video of one or more operations that the application performs on the document;

send the captured at least one of the one or more screenshots, and the video to an enforcement server associated with the endpoint DLP system; and receive one or more updated DLP policies from the enforcement server, the one or more updated DLP policies comprising changes based on the captured at least one of the one or more screenshots or the video;

wherein the one or more updated DLP policies cause the endpoint DLP system to at least one of blacklist the combination of the application and document type, restrict access to the document, encrypt the document, or move the document to a different location.

8. The endpoint device of claim 7, wherein the one or more screenshots are taken at periodic time intervals over a time span that the application is in use.

9. The endpoint device of claim 7, wherein the enforcement server analyzes the captured data to determine if at least one of malicious or suspicious activity occurred with respect to the document.

10. The endpoint device of claim 7, wherein the whitelist comprises one or more different application and document type pairs that have been approved by an administrator of the endpoint DLP system as being an allowable combination.

11. The endpoint device of claim 7, further comprising, prior to the capturing:

presenting a notice to a user of the application that the application may be subject to screenshot or video capture that present privacy issues; and allowing access to the document when the user acknowledges and accepts the notice.

12. A non-transitory computer readable storage medium including instructions that, when executed by a processing device, cause the processing device to perform a method comprising:

receiving, by an enforcement server device of a data loss prevent (DLP) system, data representing captured at least one of one or more screenshots or video of an application manipulating a sensitive document at an endpoint DLP system of the DLP system;

analyzing, by the enforcement server device, the received captured data to determine whether at least one of suspicious or malicious activity occurred with respect to the sensitive document;

updating, by the enforcement server device, one or more DLP policies based on the results of the analysis; and deploying, by the enforcement server device, the one or more updated DLP policies to one or more endpoint DLP systems;

wherein the one or more updated DLP policies cause the one or more endpoint DLP systems to at least one of blacklist the combination of the application and document type, restrict access to the document, encrypt the document, or move the document to a different location.

13. The non-transitory computer readable storage medium of claim 12, wherein the one or more screenshots are taken at periodic time intervals over a time span that the application is in use.

14. The non-transitory computer readable storage medium of claim 12, wherein the enforcement server maintains a whitelist comprising one or more different application and document type pairs that have been approved by an administrator of the enforcement server and is part of the one or more updated DLP policies.

15. The non-transitory computer readable storage medium of claim 14, wherein the instructions, when executed by the processing device, cause the processing device to perform further operations of the method comprising: if, based on the analysis, operations of the application manipulating the sensitive document are not at least one of suspicious or malicious, then adding a combination of the application and a type of the sensitive document to the whitelist.

* * * * *